United States Patent
Saijonmaa et al.

(10) Patent No.: US 8,447,286 B2
(45) Date of Patent: May 21, 2013

(54) MULTI-INTERFACE USER TERMINAL

(75) Inventors: Jaakko Saijonmaa, Espoo (FI); Juha Lehtonen, Masala (FI); Ilpo Paltemaa, Espoo (FI)

(73) Assignee: EADS Secure Networks Oy, Helsinki (FI)

( * ) Notice: Subject to any disclaimer, the term of this patent is extended or adjusted under 35 U.S.C. 154(b) by 435 days.

(21) Appl. No.: 12/512,597

(22) Filed: Jul. 30, 2009

(65) Prior Publication Data

US 2010/0035603 A1    Feb. 11, 2010

(30) Foreign Application Priority Data

Aug. 5, 2008 (FI) ........................... 20085763

(51) Int. Cl.
*H04M 3/00* (2006.01)
(52) U.S. Cl.
USPC ............. 455/418; 455/426.1; 455/553.1; 455/552.1; 455/557; 370/338; 370/339; 370/334
(58) Field of Classification Search
USPC . 455/426.1, 553.1, 552.1, 557; 370/338–339, 370/334
See application file for complete search history.

(56) References Cited

U.S. PATENT DOCUMENTS

| | | | |
|---|---|---|---|
| 7,610,057 B2 * | 10/2009 | Bahl et al. ................. | 455/522 |
| 2007/0297378 A1 * | 12/2007 | Poyhonen et al. .......... | 370/338 |
| 2008/0102815 A1 | 5/2008 | Sengupta et al. | |
| 2009/0325556 A1 * | 12/2009 | Lee et al. ................. | 455/414.2 |

FOREIGN PATENT DOCUMENTS

| | | |
|---|---|---|
| EP | 1 585 352 | 10/2005 |
| WO | WO 02/41580 | 5/2002 |
| WO | WO 2004/031488 | 4/2004 |
| WO | WO 2006/012018 | 2/2006 |
| WO | WO 2007/148186 | 12/2007 |
| WO | WO 2008/026978 | 3/2008 |

OTHER PUBLICATIONS

Search Report dated Jun. 11, 2009 for counterpart Finland Patent Application No. 20085763.
Gustafsson, Eva et al.: Article entitled "Always Best Connected", pp. 49-55, HEEE Wireless.
Communications, IEEE Service Center, Piscataway, NJ; Feb. 1, 2003.
Extended European Search Report dated Oct. 11, 2009 for counterpart European Patent Application No. 09166451.

* cited by examiner

*Primary Examiner* — Kamran Afshar
*Assistant Examiner* — Khalid Shaheed
(74) *Attorney, Agent, or Firm* — Barnes & Thornburg LLP

(57) ABSTRACT

In a communication system at least one operational criterion is applied for a group of one or more users. On the basis of such operational criterion, one or more interface rules are generated. An interface rule includes information that identifies an application that is capable of utilizing two or more communication interfaces, and also a function for determining a communication interface to be applied by that application in communications of the group of one or more users. A profile that includes interface rules generated on the basis of operational criteria to be applied for a user is created and stored in a user terminal of the user. Use of applications can be matched with operational requirements posed on or by the user, without substantial need to change the applications and/or the configuration of the terminal due to the matching.

11 Claims, 3 Drawing Sheets

MULTI-INTERFACE USER TERMINAL

CROSS-REFERENCE TO RELATED APPLICATIONS

The present application claims the benefit of priority to Finland Patent Application No. 20085763 filed 5 Aug. 2008, the contents of which are incorporated herein by reference in their entirety.

FIELD OF THE INVENTION

The present invention relates to communications of a user terminal that has two or more communication interfaces.

BACKGROUND OF THE INVENTION

Conventionally user terminals were simple devices that provided a communication interface to access services of a communication network applying the same interface. For example, early mobile phones comprised one radio unit that supported one cellular technology within a coverage area of a plurality of interconnected networks applying that same cellular technology. Along the evolving technologies, the needs of the users have increased and especially high-end multimedia cellular terminals typically comprise two or more communication interfaces that may be used simultaneously or in turns.

In cellular mobile communications terminals the straightforward conceptual way of having many independent radio access methods in a single terminal is to have all the radios potentially active simultaneously and then use one or several of those simultaneously but independently of each other. This straightforward concept, however, suffers from some disadvantages.

First, several simultaneously active radios may cause mutual radio interference, if their radio frequency bands are not separate enough. Simultaneous operation may also pose challenges to implementation of the radios and antennas. Secondly, having several radios active simultaneously causes easily high power consumption, which is not acceptable in a mobile terminal. A cellular radio with efficient energy economy 'sleep' mode is generally designed to have very small stand-by power consumption and thus enable long battery life, and still be able to receive calls whenever paged. In present wideband radios, for example Wireless Local Area Network (WLAN) radios, there is no efficient 'sleep' mode defined in the standard. This means that a terminal, which has to be continuously alert to receive signals at any time, may during wideband operation have big power consumption, even when it is in a stand-by mode.

Increased power consumption in multi-radio terminals, especially hand-held terminals, is a big challenge and typically it mandates the schemes that define the way the radios of the mobile terminal are used. The multi-radio use schemes are typically user terminal specific, and made on the basis of the design aspects (battery life, interference of radios) of the terminal device.

However, a modern user terminal comprises several voice and data user applications that are introduced to the generic user terminal by the user or the organization that provides the user with the terminal. Such applications are not designed interactively and apply the interfaces of the user terminal according to their own application schemes.

In addition, there are typically a plurality of user-specific operational requirements that in most cases cannot be taken into account in the terminal or application design. Such operational requirements may be permanent or even change dynamically depending on whether, for example, the user is in office, in a meeting, on leisure or at home, or whether an officer is during his work hours on duty or off duty. Conventional user profiles applied in user terminals comprise configuration data on the user and his capabilities and preferences in using the applications. Such profiles do not, however, comprise definitions for utilization of communication interfaces of the user terminal by these applications.

Matching the ambiguous communications interface application schemes, and personal operational requirements or wishes requires knowledge, time and effort that most users are, however, not willing to vest in using their communication devices.

SUMMARY

An object of the present invention is thus to provide an improved solution for automatically adjusting operations of the user terminal to match current operational requirements posed on or by the user. The objects of the invention are achieved by a method, a system, an apparatus and a computer program product, which are characterized by what is stated in the independent claims. Embodiments of the invention are disclosed in the dependent claims.

The invention is based on the idea of processing operational criteria of individual users into profiles that are stored into terminals of the users. A profile refers herein to a set of control data that may be activated to control operations of a user terminal. The profile may be individual for a user or for a group of users and it comprises at least one interface rule that identifies at least one application and information for determining a communication interface to be applied by the application in communications of the user. Advantageously the profile comprises also information for associating the profile with a specific operational status of the user.

Utility of the invention is that use of applications can be matched with operational requirements posed on or by the user, without substantial need to change the configuration of applications and/or the configuration of the terminal due to the matching the terminal profile to the operational status of the user.

BRIEF DESCRIPTION OF THE DRAWINGS

In the following the invention will be described in greater detail by means of preferred embodiments with reference to the attached drawings, in which.

DETAILED DESCRIPTION

It is appreciated that the following embodiments are exemplary. Furthermore, although the specification may in various places refer to "an", "one", or "some" embodiment(s), reference is not necessarily made to the same embodiment(s), or the feature in question does not only apply to a single embodiment. Single features of different embodiments may be combined to provide further embodiments.

The present invention is applicable in a communication system that provides delivery of data streams between communicating endpoints. A variety of systems applying a variety of communication technologies may be used separately or in combinations to implement the embodiments of the invention. Communication systems and technologies evolve continuously, and embodiments of the invention will require a number of modifications obvious for a person skilled in the art. Therefore all words and expressions of this specification should be interpreted broadly, as they are intended merely to illustrate, not to restrict, the embodiments.

Figure 1:
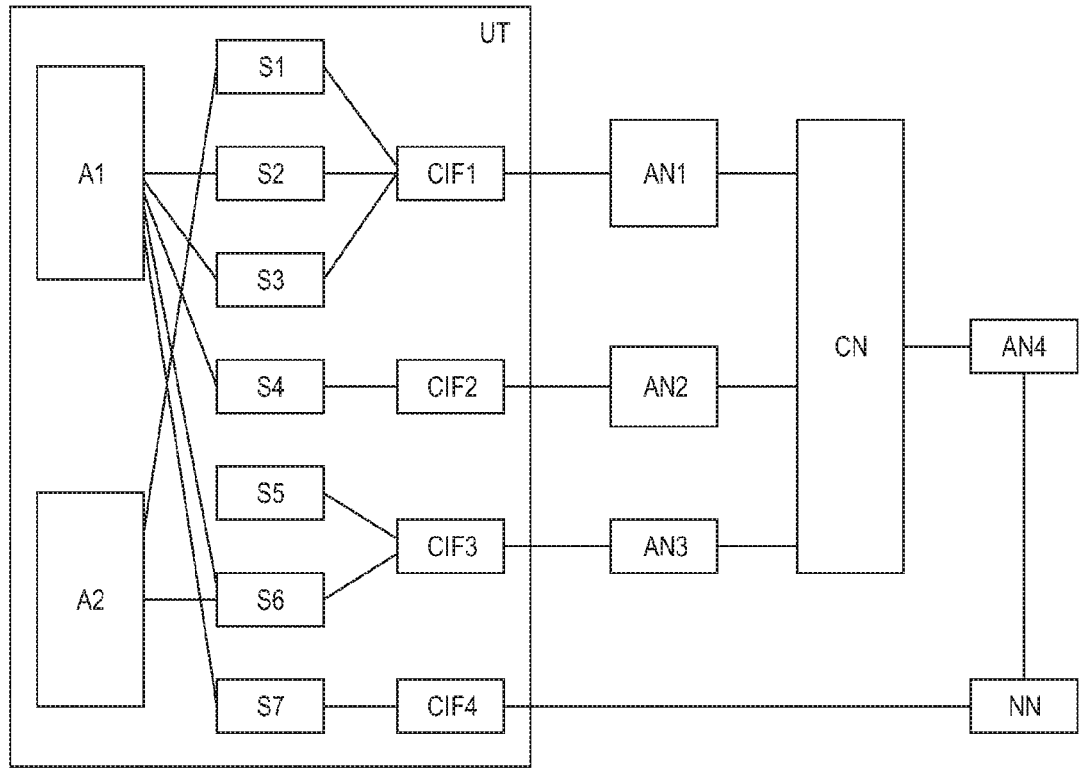
FIG. 1 shows a user terminal configured to communicate with a network.

In the following, some embodiments of the invention will be described by means of an exemplary communication system that allows a user to have an access via a plurality of connectivity types. FIG. 1 illustrates functional entities in a user terminal UT of the user. A user refers here to an operational entity whose communications are controlled by one entity. In case the entity is a person, the communications are controlled by the person him/herself. In case the entity is a legal entity, the communications are controlled by defined communication policies of the legal entity. Access refers herein to a capability of an accessing endpoint to send information to and/or receive information from an accessed communication endpoint.

Communication requires at least one access facility that provides a user with means to transmit information to one or more communicating parties and/or to receive information from one or more communication parties. Conventional user terminals used to provide one communication interface and apply one access facility with it, but for more versatile services, modern user terminals may comprise a plurality of communication interfaces CIF1, CIF2, CIF3, CIF4 through which more than one different access facilities may applied. FIG. 1 shows a user terminal UT of a user that wishes to exchange information with a network node NN.

Some of the access facilities are networked telecommunication facilities that require use of communication system elements. This means that the user terminal, together with the software, applications, and content that are directly related to it, functions within and is supported by a communication network.

The communication network typically comprises at least one or more core networks CN1, CN2, . . . that provide network services, and one or more access networks AN1, AN2, AN3, . . . through which various users may access these core network services. The core network CN refers herein to a facility comprising networks, system equipment and infrastructures that are configured to provide connections between access networks and between service enablers and access networks. An access network AN1, AN2, AN3, AN4 represents herein an implementation of network entities and interfaces that provide required transport bearer capabilities for the provision of telecommunication access services to terminal endpoints of the communication system. User terminal UT and network node NN represent herein communication endpoints, uniquely identifiable communication system entities that may source and/or sink data streams of one or more defined protocol layers.

Examples of networked telecommunication access facilities comprise systems applying technologies like GSM, GPRS, EDGE, WCDMA, LTE, HSDPA, HSUPA, mobile WiMAX (802.16e), WLAN, TETRA, TEDS, SAM, IOTA, or any combinations of them. Any other present or future network-based communication system may be applied as a communication facility without deviating from the scope of protection.

In addition there are also access facilities that are not networked telecommunication access facilities. A variety of local communication mechanisms allow direct exchange of information between the communicating devices. Examples of such mechanisms comprise, for example, Bluetooth, Infrared Data Association (IrDA), Radio Frequency Identification (RFID), Digital Enhanced Cordless Telecommunications (DECT), Dedicated Short Range Communications (DSRC), HIPERLAN, HIPERMAN, Institute of Electrical and Electronics Engineers (IEEE) 802.11, Ultra-wideband (UWB), Institute of Electrical and Electronics Engineers (IEEE) 802.16d (WiMAX), xMax, ZigBee, Institute of Electrical and Electronics Engineers (IEEE) 802.16 (WPAN), Wireless USB.

In order to apply the various available access facilities the user terminal comprises communication interfaces CIF1, CIF2, CIF3, CIF4. Communication interfaces CIF1, CIF2, CIF3 represent here networked communication interfaces. A networked communication interface refers to a functional entity that is configured to receive a signal from internal processes of the user terminal, transform the signal into a form applied in a defined access network, and transmit the encoded signal to the defined access network. The communication interface is also configured to receive a signal from the access network, transform the signal to a form applied in the internal processes of the user terminal and pass the signal forward for processing within the user terminal. Access networks AN1, AN2, AN3 may apply different fixed or radio access connectivity types.

In FIG. 1 the other endpoint NN is also shown to connect to the communication system via an access network AN4. It should be noted that the access network configuration of FIG. 1 is exemplary only. NN may connect via a separate access node, as shown in FIG. 1, or via any of the access networks AN1, AN2, AN3 applicable by the user terminal UT.

CIF4 represents here a non-networked communication interface that enables direct communication between NN and UT. For example, NN may be a home server maintained in the technical store of an operative fleet. In addition to the networked connection, NN is configured with one of the local communication interfaces mentioned above, which enables direct exchange of information with the user terminal when it is within the range applied by the local communication technology. As examples, when user returns home or when a crew returns from a work shift, they can leave their user terminals in their docking stations, that are within the range of AN4 and while the crew is out of duty, defined pieces of application information (for example, schedules, map information, large emails etc) may be downloaded or updated over the local access connection between NN and UT.

An application relates to a set of programmed routines which, together with the related hardware, performs a specific group of one or more functions. A terminal application typically has a user interface for interaction with the end-user, and enablers and connectivity for interaction with server applications to provide services for the end-user. A terminal application can be pre-installed or downloaded to the user terminal. A terminal application may work stand-alone or require connection to network. Terminal applications include, for example, voice services like duplex telephony, push-to-talk or pure data applications, like calendar, maps, navigation, messaging and e-mail. Terminal applications use the services of the operating system and other supporting enablers of the user terminal and may interface also with other applications.

Functions of the user terminal UT may be arranged into a plurality of different services. A service refers to a mechanism to enable access to one or more functions, where the access is provided using a prescribed interface and is exercised consistent with constraints and policies as specified by the service description. FIG. 1 shows a group of user terminal services S1, S2, S3, S4, S5, S6, S7. These user terminal services can be invoked by terminal applications A1, A2, and provide the capability to receive information from an application, and deliver the information in a defined form to a defined communication interface for further transmission. The terminal services can also invoke a terminal application, and deliver information received through a defined communication interface to the application.

Typically applications are coded in generic form and may be then adjusted, for example, with parameters to match requirements of the user. As long as the user is fully aware of all technical and operational requirements of the terminal applications in the user terminal and is willing to take the responsibility of adjusting them to match with the varying operational requirements, there is no problem. However, many of the users are not that keen on spending time and energy on fiddling with their communication devices, and any inconveniences encountered in using applications may put users off utilizing them. Manual adjustment is also prone to errors and needs user education. Especially in professional use the main interest of the users is in their operational responsibilities, and the applications are provided and maintained by their professional organizations. On the other hand, the amount of terminal applications is typically big to support the various demanding tasks in the field. It is therefore basically a mandatory requirement that control operations for managing use of different control interfaces by different applications in the user terminal must be performed without immediate actions by the user.

In the following, the invented solution will be illustrated in terms of an embodiment that applies a number of prevalent mobile communications technologies without limiting the invention to the terms and technologies used in as an example. Referring still to FIG. 1, let us assume that the user terminal is a mobile terminal that includes four different radio units:

CIF1=TETRA
CIF2=WLAN
CIF3=GSM/GPRS
CIF4=Bluetooth where TETRA refers to Terrestrial Trunked Radio, WLAN to Wireless Local Area Network, GSM to Global System for Mobile Communications technologies and GPRS to General Packet Radio System. The user terminal provides a group of services that access the communication interfaces as follows:
S1=TETRA voice CIF1
S2=TETRA data CIF1
S3=TETRA SDS CIF1 (short data service)
S4=WLAN data CIF2
S5=GSM voice CIF3
S6=GSM SMS CIF3
S7=Bluetooth data CIF4

Access networks AN1, AN2, AN3 denote radio access infrastructures of TETRA, WLAN and GSM/GPRS network infrastructures, respectively. AN4 denotes a local area network of a local server NN. The access networks AN1, AN2, AN3, AN4 are interconnected via a core network infrastructure CN. In addition, the local server and the user terminal may interconnect via a Bluetooth connection.

Figure 2:
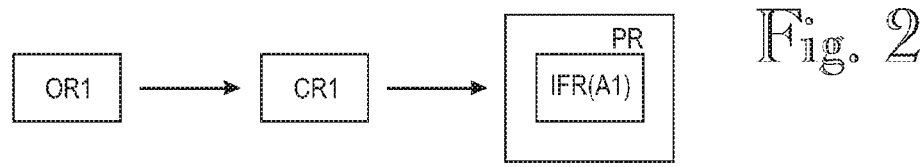
FIG. 2 illustrates a user-specific adjustment that is valid at any time for the communications of the user.

FIG. 2 illustrates basic concepts applied in the embodiment of FIG. 1. Each professional user is governed by operational requirements that define corresponding operational criteria to the communications of the user. Let us assume that UT is used by a professional user and application A1 is a phonebook application that provides a list of names and contact addresses, and allows a user to initiate a call by selecting a name and pressing a defined call initiation token (e.g. a key or a soft key). Typically the call will be initiated and the service and the communication interface will be determined according to a selection made through the application by the user.

For example, a person X in the phonebook may have a TETRA number N1. When TETRA interface CIF1 is available, the application may use that interface to make a TETRA call to number N1 directly through TETRA radio access to another TETRA phone. When TETRA voice interface CIF1 is not available but a WLAN interface CF2 or a GSM interface CIF3 is available, the application may use the GSM or the WLAN interface to make a call through WLAN or GSM access to a TETRA network. The call is implemented through a network gateway, and subsequently routed to a TETRA terminal that has the called TETRA phone number N1. Depending on the operational criteria the use of these latter WLAN and/or GSM interfaces for connecting calls may be enabled or disabled for the user.

The same person X or another person Y in the phonebook may have a listed GSM number N2. In this case, when a GSM interface CIF3 is available the call may be made directly with GSM interface to the receiving GSM number N2 in same or another GSM network. When GSM interface, CIF3 is not available, TETRA interface CIF1 may be used instead. Depending on operational criteria the latter TETRA interface CIF1 of connecting call to a GSM number N2 may be enabled or disabled. So in these cases the receiving terminal telephone number in the phone book may be considered as a parameter that activates the profile defining which radio interfaces are presently allowed to be used.

Typically in professional organizations there are a variety of security levels for communications between different users, and for some users the security constraints are heavier than for others. Let us assume that the user of UT is a high-ranking officer whose communications need to be always encrypted in the air interface. Generic phonebook applications do not provide interaction with specific security requirements of users and typically mainstream application providers are not even interested to add these types of niche features to their software. On the other hand, tailoring of such applications would be costly and cause further maintenance needs for the organization employing the user, so generic applications would be highly preferred.

In this embodiment, the security requirement posed on the user generates an operational requirement OR1 to the communications of the user. The requirement states that at least any operational communications of the user must be specially encrypted when it passes the air interface. Specifically means here encryption beyond the GSM and WLAN air interface encryption, which is typically not considered sufficient to guarantee security for important communications. On the basis of this criterion, a communication rule CR1: disable services S4, S5, S6, S7 is generated for the application A1. CR1 disables from the phonebook application A1 services S4, S5, S6, S7 that apply radio interfaces CIF2, CIF3, CIF4 that do not provide the required air interface encryption. This communication rule is considered as an interface rule IFR(A1) for application A1 and included into an application profile PR of the user. When application A1 is activated in the user terminal of this particular user, its attempts to activate WLAN, GSM and Bluetooth services are disabled. If the valid alternative (TETRA Voice call) is enabled, the application may continue its normal operation, but operates now fully in line with the individual security requirements set for the user.

The implementations provide a number of advantageous variations. For example, as described in the above phonebook embodiment, a person may have in the phone book a GSM called phone number N2. It may be further defined that the communication rule CR1 disables interfaces CIF2 (WLAN) and CIF3 (GSM) only for TETRA called telephone numbers, but still enables those interfaces for other numbers, for example GSM called telephone numbers. It is understood that the security of the receiving party in GSM access can not be improved from that provided by standard GSM air interface. However, ability to make calls, even less secure ones, to GSM and WLAN numbers may, in some cases, be essential. The adjustment would ensure use of best possible air interface encryption whenever TETRA interface is available but not completely rule out less secure access means. An alternative option here is to adjust the communication rule CR1 to enable all interfaces, including CIF2 (WLAN) and CIF3 (GSM), but to deploy end-to-end secured connections for GSM called parties, requiring end-to-end security support from the called GSM party.

Figure 3:
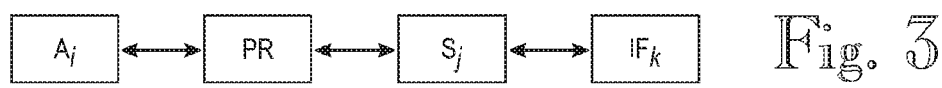
FIG. 3 illustrates functional elements in the user terminal.

As shown in FIG. 3, advantageously the application profile PR is operatively stored in the user terminal UT between the set of applications A and services S that apply interfaces IF. This results in an arrangement where the user terminal may be a generic version that provides the mainstream services S and interfaces IF designed by the terminal manufacturer and generic applications A may be taken into use in the user terminal, but the use of these interfaces by any of the applications is at any times adapted to match the operational criteria of the specific user. The profile may be implemented as a control element that is called by the user terminal at any time it activates one of the applications in the user terminal. The profile may also be implemented as a terminal application that is activated by any other terminal application in the user terminal when they are activated.

Figure 4:
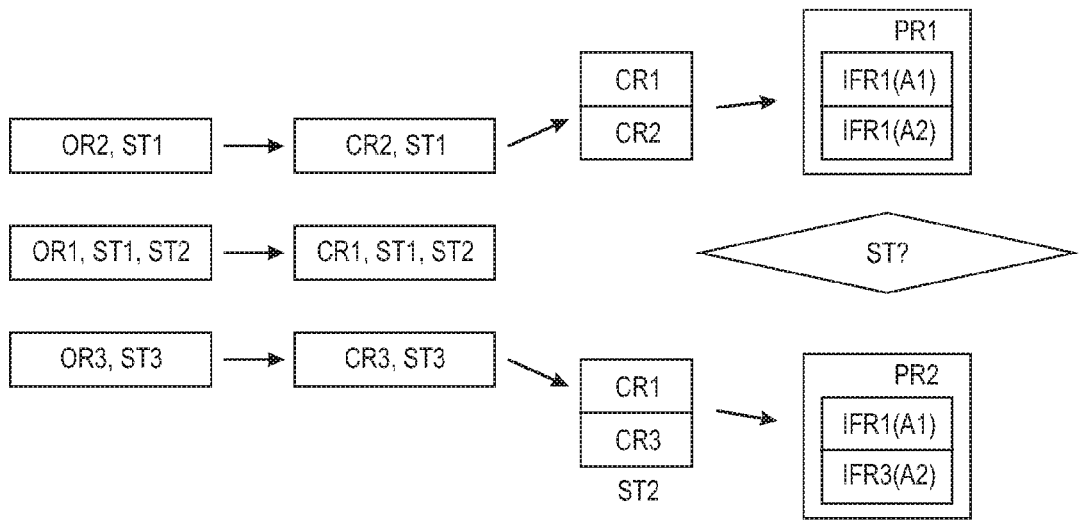
FIG. 4 illustrates a further embodiment where the adjustment is made dynamically.

The profile of FIG. 2 represents a user-specific adjustment that is valid at any time for the communications of the user. FIG. 4 illustrates a further embodiment where the adjustment is made dynamically. In such adjustment it is further considered that the operational requirements typically change according to the operational status of the user. For example, during his shift, the fireman is expected to be able to be reached extremely quickly and reliably, and this requirement prevails over any other requirements. On the other hand, when not in shift, the connection setup time requirements may be alleviated in order to enable large over-the-air data transmissions, for example, update of map information for the map applications.

In the case of FIG. 4, the responsibilities vested on the user pose some professional requirements, and these generate a set of operational requirements to the communications of the user. The validity of these operational requirements may vary according to an operational status of the user. Let us assume that the user has two operational states, ST1 when he is on duty and ST2 when he is off duty. OR1 corresponds with the static operational requirement discussed in FIG. 1 and it is valid during both of the operational statuses ST1 and ST2. Correspondingly, the resulting communication rule CR 1, which disables from the phonebook application A1 services that enable calls to TETRA numbers over radio interfaces without TETRA air interface encryption, associates with both operational states ST1 and ST2.

Let us assume A2 is a map application that may be used by the user to navigate to places and receive additional information on the site that is the target of an ongoing operation. When the officer user is on duty, it is essential that he can receive calls, especially high priority calls or emergency calls immediately they are initiated. On the other hand, downloading and/or maintaining information for the map application is a data intensive operation that is preferably done over a wideband communication resource, for example using the WLAN interface CIF2 of the user terminal. WLAN service, however, is not designed to support such prioritizations. If an emergency voice call comes in during an ongoing data session, the user terminal is either made to operate two of the interfaces simultaneously or the two connections interfere. In mobile user terminals simultaneous operations of two interfaces are typically not supported, there are too many radio interference and battery related problems to provide such flexibility. Therefore, the session is typically either finished before the priority voice call is connected or the session is disconnected and resumed from the beginning again when the voice call ends.

Neither of these conventional options is very practical. In case the session is interrupted, the whole data intensive operation needs to be restarted, and due to the spurious nature of professional communications, it is likely to be interrupted repeatedly during the shift. On the other hand, second or even tens of seconds of waiting before connecting the prioritized calls is totally unacceptable.

However, TETRA systems support alternating voice and data. In alternating voice and data, voice may be prioritized over data, but an ongoing data session does not need to be disconnected due to the incoming voice call. The session may be put on hold and resumed right away after the prioritized voice call ends. Basically this arrangement would solve the problem of the conventional solutions, but the additional aspect is that in conventional TETRA air interface the data rates are fairly small, so data intensive tasks, where the amount of data to be transferred is big, the possibility to use broadband transfer capacity, like WLAN, would be preferred.

In the present embodiment this is solved by defining separate operational requirements that are valid at different times. Let us assume that professional users of a particular organization are governed by operational requirements:

OR2=Enable prioritized voice calls when on duty
OR3=Use broadband in any data transmission for data packets of more than 500 kB data when off duty These operational requirements are transformed into communication rules:

CR2=Disable S4
CR3=Enable S4 and a status indication S=ST1 or ST2 for application A2. All communication rules of the user may be compiled into interface rules IFR(A2), IFR(A3) of separately activated profiles or sub-profiles PR1, PR2 that are activated according to the status S of the user.

Figure 5:
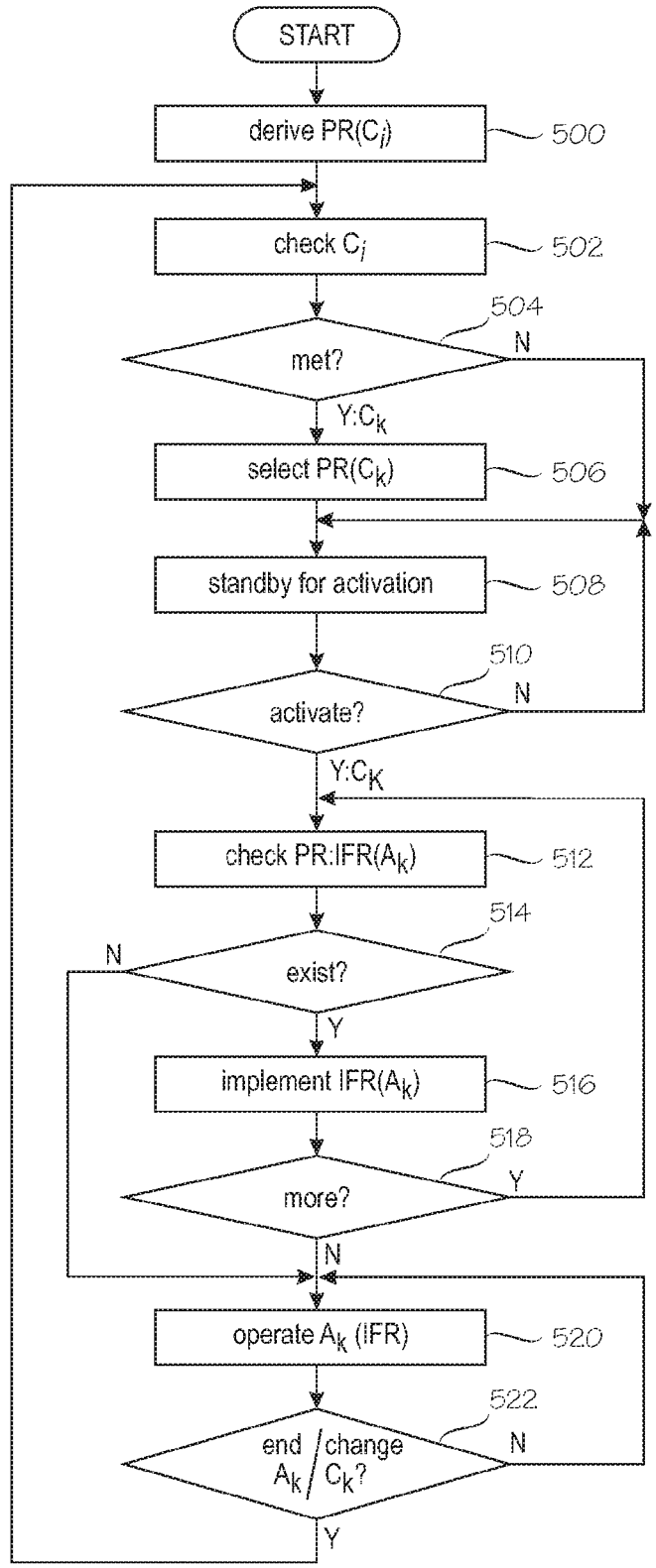
FIG. 5 illustrates steps of a procedure implemented in the embodied user terminal.

FIG. 5 illustrates steps of a procedure implemented in the user terminal during operation and applying the interface rules. The procedure begins in a stage where the user terminal is switched on and operational. In the beginning, the profile or profiles PR are derived (500) in the user terminal. The derivation of the profile may comprise transferring a profile defined and stored in a network node to the user terminal over the air interface. The user terminal may alternatively be configured with a terminal application that through the user interface of the user terminal queries information from the user and generates the profile or profiles on the basis of the information. In the present example, two profiles PR1 and PR2 are derived in the user terminal.

It is checked (502) whether one or more conditions need to be met to select an applicable profile. If (504) a condition Ck is detected to be met, a corresponding profile PR (Ck) is selected (506) as an active profile PR. Otherwise a default profile may be used as the active profile PR or no profile will be applied, and the active profile will be empty. In the present embodiment, let us first assume that the user is in the shift. The query 504 comprises check of status S and in this situation returns value ST2, resulting to an applicable PR=PR1.

After determining the applicable PR, the user terminal becomes standby (508) for activation of an application. If (510) an application Ak is activated, the active profile PR is checked (512) for interface rules IFR(Ak) that apply for application Ak. If (514) such interface rule IFR(Ak)j is detected, it is implemented, and the user terminal checks (518) whether more interface rules exist. If not, the Ak may be activated and operated according to the interface rules IFR (Ak)j of the profile applying to it. When the application is terminated or the condition changes (522), the procedure returns to 502 of checking the conditions.

In the present embodiment, let us assume that the user in his shift activates (510, 512) the map application A2. The active profile PR1 comprises an interface rule IFR(A2) that applies to application A2 (514). The interface rule of disabling S4 that applies the WLAN interface is implemented (516). Since the profile PR does not comprise more interface rules for A2 (518) use of the map information begins (520). Throughout the shift the user may now use the map application, and the interface is selected in the application according to the generic definitions. However, since the WLAN interface is ruled out, all data communication is performed using the TETRA interface that supports alternating voice and data services. As long as the condition S remains the same, the same interface rules remain activated in the user terminal.

When the shift of the user ends, the status S changes accordingly. This may also be implemented from a remote network node, for example from a dispatcher station that detects the change of shift. The detection may result from, for example, a status message sent by the user or over a voice connection between the user and the dispatcher. In this case, the WLAN service S4 is enabled, and the data intensive operations, like for example downloading maps and other information to the user terminal ma be implemented over broadband connections.

In the present embodiment the condition associated to profiles related to status, but other conditions may be applied without deviating from the scope of protection. The conditions may also be aggregated.

For example, if the user is a fireman or a police, it is of utmost importance that the user terminal may be used in the field at least for the duration of one shift without charging. Conventionally this requirement has been tackled by generating power saving modes and introducing more and more powerful batteries to the user terminals. However, some interfaces, and accordingly services applying them, are inherently very power consuming, and their power consumption can be further optimized only to a defined level. If such applications run continuously in the terminal, it is possible, that despite any efficient and optimized device configuration, the battery runs out during a long and active shift.

In order to avoid this, there is given an operational requirement OR4 (not shown) that mandates that the battery lifetime may not be compromised during the critical work shift. The PR1 may thus be complemented with two further interface rules IFR3(A2) and IFR4(A2) for A2 and associated conditions that apply battery charging level BATT limits L1 and L2 such that:

C3 is met when 0<BATT<L1, results to IFR3(A2)
C4 is met when L1<BATT<L2, results to IFR4(A2)

If BATT exceeds L2, no interface rule needs to be applied.

IFR3(A2) is applied when the battery is very low, and it defines that no data communication may be applied anymore, and the voice communication is concentrated to TETRA service S1 that applies the communication interface CIF1. When A2 is activated, none of the user terminal's requests for services S2, ..., S7 are responded positively, and the map information operates with the internal databases stored in the user terminal.

IFR4(A2) is applied when the battery is not nearly full, but is still operable for a fairly long time. In this case data communication is enabled, but only through interfaces that support energy save mode. For example, in the above embodiment, other interfaces are disabled by disabling services S2 ..., S7 that apply them.

The above detailed embodiments are based on exemplary operational requirements and interface rules. For a person skilled in the art it is clear that a variety of operational requirements and rules may be applied without deviating from the scope of protection.

For example, in critical professional use, the user must be able to communicate immediately in a push-to talk (PTT) voice application; the acceptable delay for voice connection setup is typically of the order of 300-400 ms. In order to achieve this, the radio link has to be activated before a talk spurt takes place. With such limited period the radio link must therefore be active continuously or allow paging in around 100 ms, as the start time of the talk spurt cannot be predicted. In professional radio interface descriptions, the mechanisms have been designed to meet the fast connection setup requirements while most of the public cellular technologies provide sleep modes and additional checks that extend the connection setup time to seconds, i.e. far beyond the limits acceptable in professional mobile use. So in this case the interface rules have to restrict the use of radio interfaces from one or more applications in such way that during the shift the fast paged radio, typically a professional mobile radio is active and used for all voice and data communications. Cellular or WLAN alternatives would be banned during the shift but allowed when out of shift.

As another example, in their communications users send and receive different sizes of data blocks and the communication interface is selected according to (or actually by) the application used for inputting or outputting the information to be transferred. However, an operational requirement may be adjusted to apply at each time an interface that best matches with the amount of data to be transferred. In order to achieve this, there may be defined a set of interface rules that are called by any application providing transmission of data from the user terminal. The interface rules may be based on the amount of data to be transferred and a target time for the transfers. Their ratio may be determined and checked against applicable bandwidths in the user terminal. The interface to be applied may be selected according to this comparison, notwithstanding the application used for inputting the data to be transferred. For example, in view of the previous TETRA examples:

0-1 kb/s SDS
1-2 kb/s TETRA IP
2-50 kb/s TEDS
50- WLAN

Other operational requirements and associated interface rules based on, for example, to quality of service or priority requirements concerning the data to be transmitted, or the like may be applied. On the basis of the concepts and procedures described herein, generation of further interface rules is clear to a person skilled in the art.

Figure 6:
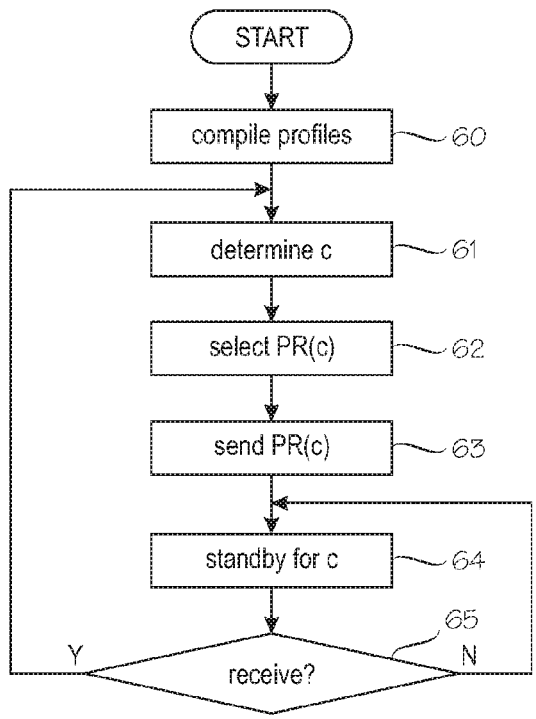
FIG. 6 illustrates steps of a procedure implemented in an embodied network node.

As discussed above, the derivation of profile or profiles for the user terminal may take place in the user terminal itself, or in a network node managing the operations of the user terminal. FIG. 6 illustrates steps in a network node that embodies the solution according to the invention. The procedure begins when the network node is switched on and operative. The network node compiles (60) a profile for the user. The compilation operation may comprise programming and adjustments made in the network node, or retrieving profile information from an external database, XML document or URL address, for example. The network node also determines (61) the conditions c associated to the profiles, and selects (62) profile or profiles PR(c) to be sent to the user terminal. The profile or profiles PR(c) are sent (63) to the user terminal. The network node becomes standby (64) for new condition information from the user terminal. If such is received (65), the procedure moves to 61 to recognize it.

Figure 7:
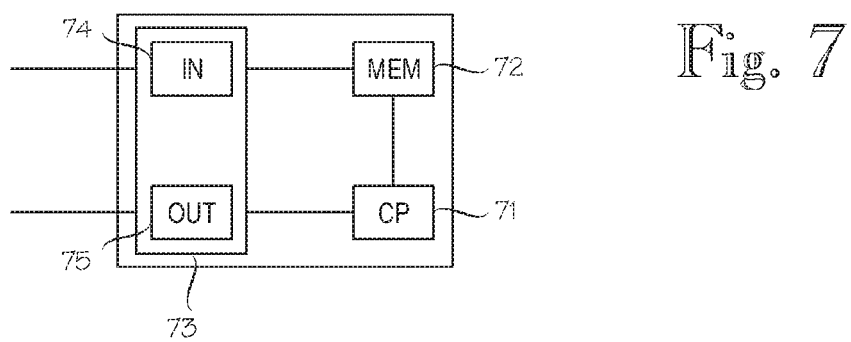
FIG. 7 illustrates an embodiment of hardware architecture of a user terminal or a network node.

FIG. 7 illustrates an exemplary hardware configuration for the implementation of embodied apparatuses, for example applicable as the network node NN, or the user terminal UT of FIG. 1. The apparatus comprises a control unit 71, a processor element that comprises an arithmetic logic module, a number of special registers and control circuits. The apparatus also comprises a memory unit 72, a data medium where computer-readable data or programs or user data can be stored. The memory means typically comprise memory modules that allow both reading and writing (RAM), and memory modules whose contents can only be read (ROM). The apparatus also comprises an interface unit 73 with input unit 74 for inputting data for internal processing in the apparatus, and output unit 75 for outputting data from the internal processes of the apparatus.

Examples of said input unit 74 in a network node NN comprise plug-in units acting as a gateway for information delivered to its external connection points. For receiving information from the operator, the input unit 74 may also comprise a keypad, or a touch screen, a microphone, or the like. Examples of said output unit 75 in the network node NN include plug-in unit feeding information to the lines connected to its external connection points. For outputting information to the operator, the output unit 75 may also comprise a screen, a touch screen, a loudspeaker, or the like.

The interface unit 73 of a user terminal typically comprises at least a user interface unit for communicating with the user and a radio interface unit for communication over the radio access network. In addition, the interface unit comprises the additional communication interface unit, for communication over another type of networks, or in another frequency, or over local communication technologies, as described above.

The control unit 71, memory unit 72, and interface block 73 are electrically interconnected to perform systematic execution of operations on received and/or stored data according to predefined, essentially programmed processes of the apparatus. In solutions according to the embodiments of the invention, these operations comprise functions for implementing the logical units, operations and interfaces of the network node NN as described in FIGS. 1 and 6 above, or of a user terminal UT, as described in FIGS. 1 to 5 above.

The units and blocks of the apparatus may be implemented as one or more integrated circuits, such as application-specific integrated circuits (ASIC). Other hardware embodiments are also feasible, such as a circuit built of separate logic components. A hybrid of these different may also be applied. All modifications and configurations required for implementing functionality of an embodiment may be performed as routines, which may be implemented as added or updated software routines, application circuits (ASIC) and/or programmable circuits. Software routines may be downloaded into the apparatus.

It should be noted that only elements necessary for disclosing the present embodiment are illustrated in FIG. 7. For a person skilled in the art it is clear that communication apparatuses comprise a plurality of further elements and functionalities not explicitly illustrated herein. In addition, the blocks illustrate logical or functional units that may be implemented in or with one or more physical units, notwithstanding whether they are illustrated as one or more blocks in FIG. 7.

The management of the profiles and radio interfaces computer program in the user terminal may be, for example, integrated with the operation system, a middleware layer over the operation system to control the access to the radio interface protocol layers, or an additional application in the terminal, configured to control the connections of the applications to the radio interface Application Programming Interfaces (API) of the terminal. Notwithstanding the way of integration of the computer programs within the terminal overall architecture, they may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

It will be clear to a person skilled in the art that, as the technology advances, the inventive concept can be implemented in various ways. The invention and its embodiments are not limited to the examples described above but may vary within the scope of the claims.

The invention claimed is:

1. A method, comprising:
defining at least one operational criterion to be applied for a group of one or more users;
generating, based on the at least one operational criterion, one or more interface rules, an interface rule comprising information identifying at least one application capable of utilizing two or more communication interfaces of user terminals, and a function for determining a communication interface to be applied by that application in communications of the group of one or more users;
creating a profile that comprises interface rules generated based on operational criteria to be applied for a user;
storing the profile in a user terminal of the user; and
applying the interface rules of the profile in operations of the user terminal,
wherein an interface rule in the profile is derived in the user terminal from the at least one operational criterion and the at least one operational criterion is for controlling the use of communication interfaces and relates to one or more of the following communication parameters: security of transmissions, power consumption of the radio interface, battery life or battery charge status of the user terminal, paging speed provided in the communication interface, bandwidth available in the communication interface; quality of service available in the communication interface, and levels of priority provided in the communication interface or telephone number of the receiving communications party.

2. A user terminal, comprising
an interface unit providing at least two different communication interfaces for communication;
an application capable of utilizing two or more communication interfaces of the user terminal;
a control unit operatively coupled with the application and the interface unit and configured to operate the user terminal to:
derive a profile that comprises one or more interface rules, an interface rule comprising information identifying the application capable of utilizing two or more communication interfaces of the user terminal, and a function for determining a communication interface to be applied by that application in communications of the user terminal; and
apply the interface rules of the profile in operations of the user terminal,
wherein an interface rule in the profile is derived in the user terminal from an operational criterion applied to the user of the user terminal and the operational criterion is for controlling the use of communication interfaces and relates to one or more of the following communication parameters: security of transmissions, power consumption of the radio interface, battery life or battery charge status of the user terminal, paging speed provided in the communication interface, bandwidth available in the communication interface; quality of service available in the communication interface, and levels of priority provided in the communication interface or telephone number of the receiving communications party.

3. The user terminal of claim 2, wherein the user terminal further comprises a terminal application and a user interface and wherein the control unit is further configured to operate the terminal application to derive the profile by querying through the user interface of the user terminal information from the user and generate the profile based on the queried information.

4. The user terminal of claim 2, wherein
the interface unit is configured to provide a connection to a network node; and
the control unit is further configured to operate the user terminal to receive interface rules from the network node.

5. The user terminal of claim 2, wherein the user terminal is configured to select one or more interface rules to be applied in the user terminal.

6. A network node, comprising:
an interface unit configured to provide a connection to a user terminal; and
a control unit operatively coupled to the interface unit and configured to operate the network node to:
store a profile that comprises interface rules, an interface rule comprising information identifying an application capable of utilizing two or more communication interfaces of a user terminal, and a function for determining a communication interface to be applied by that application for user terminal communications; and
provide the profile to the user terminal,
wherein an interface rule in the profile is derived in the user terminal from an operational criterion applied to the user of the user terminal and the operational criterion is for controlling the use of communication interfaces and relates to one or more of the following communication parameters: security of transmissions, power consumption of the radio interface, battery life or battery charge status of the user terminal, paging speed provided in the communication interface, bandwidth available in the communication interface; quality of service available in the communication interface, and levels of priority provided in the communication interface or telephone number of the receiving communications party.

7. The network node of claim 6, wherein the control unit is further configured to operate the network node to send the profile to the user terminal in response to a request by the user terminal.

8. The network node of claim 7, wherein the request is a status message provided by the user of the user terminal and indicates a change in operational status of the user.

9. The network node of claim 6, wherein the control unit is further configured to operate the network node to send the profile to the user terminal in response to a request by a dispatcher station.

10. A communications system comprising a user terminal according to claim 2 and a network node comprising:
an interface unit configured to provide a connection to a user terminal; and
a control unit operatively coupled to the interface unit and configured to operate the network node to:
store a profile that comprises interfaced rules, an interface rule comprising information identifying an application capable of utilizing two or more communication interfaces of a user terminal, and a function for determining a communication interface to be applied by that application in communications of the user terminal; and
provide the profile to the user terminal.

11. A non-transitory computer readable medium storing a computer program of instructions for executing a computer process in a user terminal, the instructions causing the computer to perform a method comprising:
deriving, within the user terminal, a profile that comprises interface rules, an interface rule comprising information identifying an application capable of utilizing two or more communication interfaces of the user terminal, and a function for determining a communication interface to be applied by that application in communications of the user terminal; and
applying the interface rules of the profile in operations of the user terminal,
wherein an interface rule in the profile is derived in the user terminal from an operational criterion applied to the user of the user terminal and the operational criterion is for controlling the use of communication interfaces relates to one or more of the following communication parameters: security of transmissions, power consumption of the radio interface, battery life or battery charge status of the user terminal, paging speed provided in the communication interface, bandwidth available in the communication interface; quality of service available in the communication interface, and levels of priority provided in the communication interface or telephone number of the receiving communications party.

* * * * *